United States Patent
Akiba

(10) Patent No.: US 6,611,067 B2
(45) Date of Patent: Aug. 26, 2003

(54) ELECTRIC POWER SUPPLIER, METHOD FOR CONTROLLING SUPPLYING OF ELECTRIC POWER, AND INFORMATION PROCESSING DEVICE

(75) Inventor: Akihiro Akiba, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/854,572

(22) Filed: May 15, 2001

(65) Prior Publication Data

US 2001/0040410 A1 Nov. 15, 2001

(30) Foreign Application Priority Data

May 15, 2000 (JP) .......................... 2000-141225

(51) Int. Cl.[7] .................................. H02J 1/00
(52) U.S. Cl. ........................ 307/39; 307/66; 320/134
(58) Field of Search ............................. 307/39, 64, 45, 307/66; 320/134, 135, 162, 164

(56) References Cited

U.S. PATENT DOCUMENTS

| | | | | |
|---|---|---|---|---|
| 4,641,042 A | * | 2/1987 | Miyazawa | 307/43 |
| 5,245,522 A | * | 9/1993 | Kawaguchi et al. | 323/207 |
| 5,247,205 A | * | 9/1993 | Mototani et al. | 307/23 |
| 5,371,667 A | * | 12/1994 | Nakao et al. | 363/124 |
| 5,557,188 A | * | 9/1996 | Piercey | 320/134 |
| 6,003,139 A | * | 12/1999 | McKenzie | 365/226 |

* cited by examiner

Primary Examiner—Brian Sircus
Assistant Examiner—Sharon A. Polk
(74) Attorney, Agent, or Firm—Whitham, Curtis & Christofferson, PC

(57) ABSTRACT

An electric power supplier includes an alternating/direct current conversion circuit, a first path, a second path, a switch circuit, and a current detection circuit. The alternating/direct current conversion circuit converts an alternating voltage to a direct voltage. One end of the first path is connected to a first load. One end of the second path is connected to the first path, and the other end thereof is connected to a second load. The first and second paths supply output voltage of the alternating/direct current conversion circuit to the first and second loads. The current detection circuit detects a value of the output current flowing through a node between the first and second paths, and controls the switch circuit, formed in the second path, to electrically connect or disconnect the node to/from the second load, based on a detected current value.

21 Claims, 6 Drawing Sheets

ELECTRIC POWER SUPPLIER, METHOD FOR CONTROLLING SUPPLYING OF ELECTRIC POWER, AND INFORMATION PROCESSING DEVICE

BACKGROUND OF THE INVENTION

1. Field of the Invention

The present invention relates to an electric power supplier, a method for controlling supplying of electric power, and an information processing device.

2. Description of the Related Art

An electric power supplier for use in an information processing device, such as a personal computer and the like, includes an AC-DC converter, DC-DC converter, etc.

The electric power supplier converts an alternating voltage into a direct-current voltage, using the AC-DC converter, and converts an output voltage value of the AC-DC converter into a plurality of direct-current voltage values, using the DC-DC converter. Output voltages of the DC-DC converter are sent to each section included in the information processing device, such as a CPU (Central Processing Unit), memory, hard disk drive, etc.

Conventionally, the electric power supplier supervises whether the AC-DC converter is overloaded, and includes a current detection circuit and a detection resistor so as to avoid such an overloaded state of the AC-DC converter. The detection resistor is formed on a power supplying line for supplying electric power from the AC-DC converter to the DC-DC converter. The current detection circuit detects a current flowing through the resistor for detection, controls the DC-DC converter and reduces the output voltage of the DC-DC converter in the case where the detected current value exceeds a rated current value of the AC-DC converter (i.e. in the case where an overcurrent flows through the detection resistor).

However, in the conventional electric power suppliers, in the case where the AC-DC converter is prevented from being in an overloaded state, a reduction occurs in the voltage to be supplied to each section included in the information processing device, such as the CPU, etc. Hence, the electric power lacks in those devices, such as the CPU, memory, and the like which require sufficient electric power to operate.

SUMMARY OF THE INVENTION

The present invention has been made in consideration of the above. It is accordingly an object of the present invention to provide an electric power supplier which can continuously supply a predetermined load of the supplier with electricity required by the load, a method for controlling supplying of electricity and an information processing device.

In order to achieve the above object, according to the first aspect of the present invention, there is provided an electric power supplier comprising:

an alternating/direct-current conversion circuit which converts an alternating voltage into a direct voltage, and outputs a converted voltage;

a first path, one end of which is connected to the alternating/direct-current conversion circuit, and other end of which is connected to a first load, the first path supplying output voltage of the alternating/direct-current conversion circuit to the first load;

a second path, one end of which is connected to the first path, and other end of which is connected to a second load, the second path supplying output voltage of the alternating/direct-current conversion circuit to the second load;

a switch circuit which is formed in the second path; and a current detection circuit which detects a value of a current flowing a portion of the first path between the alternating/direct current conversion circuit and a node between the first path and the second path, and controls the switch circuit to electrically connect or disconnect the node to or from the second load, based on a detected current value.

The current detection circuit may control the switch circuit to electrically connect or disconnect the node to or from the second load, based on a difference between the detected current value and a predetermined current value, so that the detected current value becomes lower than the predetermined current value.

The current detection circuit may control the switch circuit to electrically connect or disconnect the node to or from the second load, in accordance with at least one of the difference between the detected value and the predetermined current value, an integrated result of the difference, and a differentiated result of the difference.

The current detection circuit may control the switch circuit to electrically disconnect the node from the second load, in a case where the detected value of the current is equal to or larger than a reference value which is an output current value of the alternating/direct-current conversion circuit being overloaded, and to electrically connect the node to the second load, in a case where the detected value of the current is lower than the reference value.

The current detection circuit may include a passive element which is formed in a portion of the first path located between the alternating/direct-current conversion circuit and the node, and detect a value of a current flowing through the passive element, and compare a detected value of the current with the reference value.

The current detection circuit may include a current control circuit which:

generates a control signal for controlling an operation of the switch circuit, based on a voltage generated across the passive element; and supplies the switch circuit with a generated control signal; and wherein the switch circuit may electrically connect or disconnect the node to or from the second load, in accordance with the control signal.

The passive element may comprise a fuse.

The passive element may comprise a coil included in a noise filter.

A signal may represent whether the second load is possible to electrically be disconnected from the node; and the current control circuit may generate the control signal for controlling an operation of the switch circuit, in a case where a current flowing through the passive element is equal to or larger than the reference value and the signal sent from the second load represents that the second load is possible to electrically be disconnected from the node.

The first load may comprise a voltage-value conversion circuit which converts a voltage having a value of the alternating/direct-current conversion circuit into voltages having a plurality of values, and outputs the plurality of voltage.

The voltage-value conversion circuit may be connected to an information processing unit including a microprocessor and a memory.

The second load may comprise a battery circuit including a secondary battery; and the battery circuit may detect whether the secondary battery is fully charged with electricity, and send a detection signal which represents detection results to the current control circuit; and the current control circuit may generate the control signal for electrically disconnecting the node from the second load, in a case where the current flowing through the passive element is equal to or larger than the reference value and the detection signal represents that the secondary battery is fully charged.

In order to achieve the above object, according to the second aspect of the present invention, there is provided a method for controlling supplying of electric power, comprising:

sending electric power to a first load from a power circuit via a first path;

sending electric power to a second load from the power circuit via a second path connected to the first path;

detecting a value of the electric power sent from the power circuit to the first and second loads; and electrically connecting and disconnecting a node between the first and second paths to or from the second load, based on a detected value of the electric power.

The electrically connecting and disconnecting may include:

electrically connecting and disconnecting the node to or from the second load, so that the detected value of the power becomes equal to or lower than the predetermined value, based on a difference between the detected value and a predetermined value of the power.

The electrically connecting and disconnecting may include:

electrically connecting or disconnecting the node to or from the second load, in accordance with at least one of the difference between the detected value of the power and the predetermined value of the power, an integrated result of the difference, and a differentiated result of the difference.

The electrically connecting and disconnecting may include:

electrically disconnecting the node from the second load, in a case where the detected value of the electric power is equal to or higher than a reference value which is output power of the power circuit being overloaded; and electrically connecting the node to the second load, in a case where the detected value of the electric power is lower than the reference value.

The detecting may include:

detecting a value of output power of the power circuit, based on a value of a current flowing through a passive element which is formed in a portion of the first path between the power circuit and the node; and comparing a detected value with the reference value.

The detecting may include:

generating a control signal for controlling an operation of a switch circuit which is formed in the second path;

sending the control signal to the switch circuit; and wherein the electrically connecting and disconnecting may include connecting and disconnecting the node to or from the second load by controlling the switch circuit, in accordance with the control signal.

The passive element may comprise a fuse, or a coil included in a noise filter.

The sending the control signal includes:

accepting a permitting signal, for permitting the second load to electrically be disconnected from the node; and generating the control signal for controlling an operation of the switching circuit, in a case where the detected value of the power is equal to or higher than the reference value and the permitting signal sent from the second load represents that the second load is possible to electrically be disconnected from the node.

In order to achieve the above object, according to the third aspect of the present invention, there is provided an information processing device comprising:

the electric power supplier according to claim 1; and an information processing unit which is connected to the electric power supplier and driven by a voltage, applied thereto and sent from the electric power supplier; and wherein the information processing unit includes a memory which stores information, an operational input section which inputs an instruction, an input/output control section which performs inputting and outputting processing, a display section which displays information, and a processor which supervises a state of the operational input section through the input/output control section, reads out information from the memory and/or an external memory, executes processing based on read information, and controls the display section to display information corresponding to executed processing.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENTS

Preferred embodiments of the present invention will now be explained with reference to the accompanying drawings.

First Embodiment

An electric power supplier is used in a state where it is connected to a target device to be connected. Explanations will now be made to an electric power supplier according to the first embodiment of the present invention. A personal computer, including the electric power supplier and an information processing unit connected to the electric power supplier installed therein, will now specifically be described by way of example.

Figure 1:
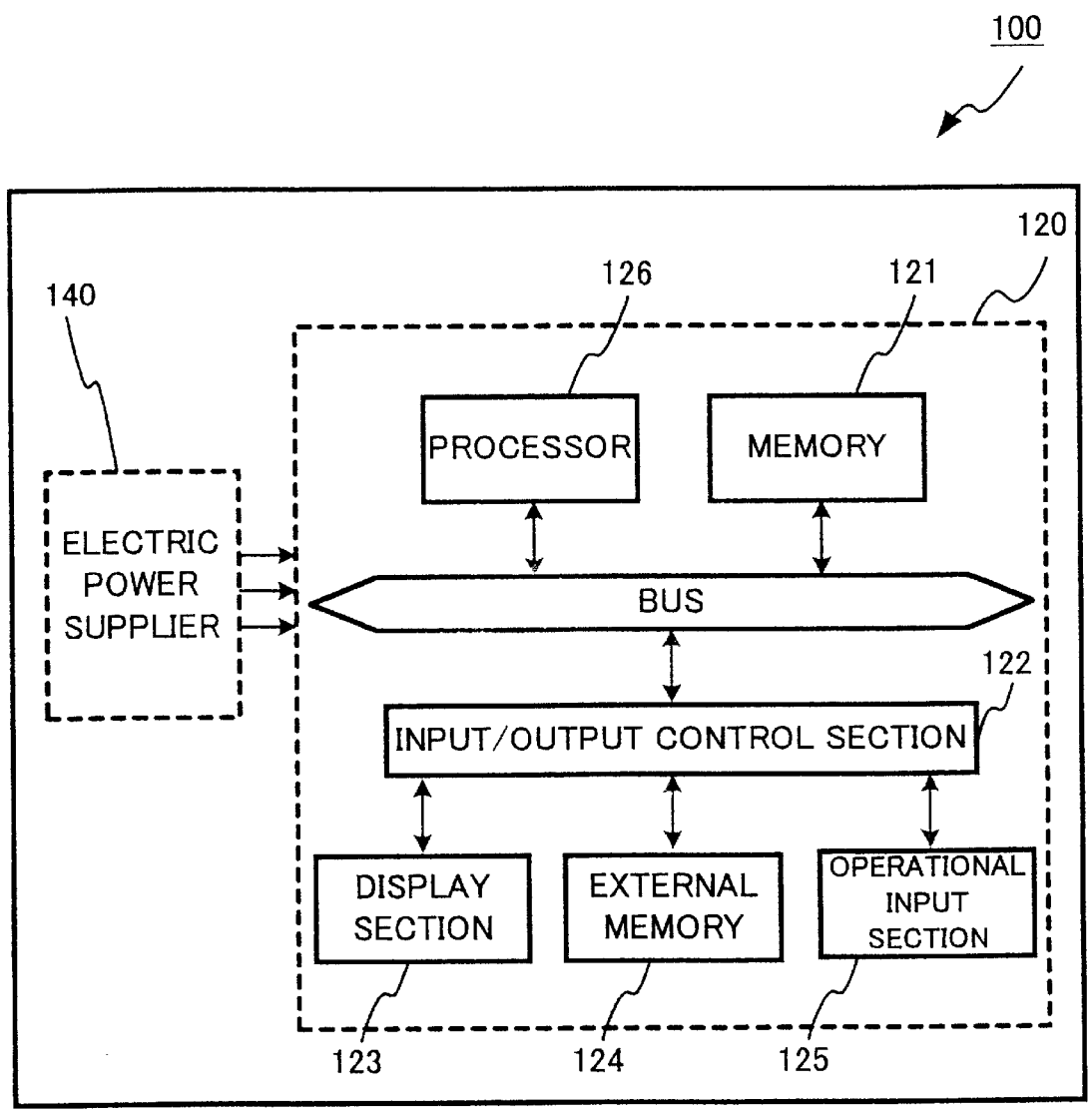
FIG. 1 is a block diagram showing the structure of a personal computer.

FIG. 1 is a block diagram showing the structure of a personal computer 100, in which the electric power supplier according to the first embodiment is installed. This personal computer 100 briefly includes an information processing unit 120 and an electric power supplier 140.

The information processing unit 120 has the structure for realizing an information processing function which is fundamental to a general-purpose computer. The electric power supplier 140 supplies each section, such as a bus, etc., included in the information processing unit 120 with electric power. The supplying of the electric power toward the information processing unit 120 is shown and represented by three arrows in FIG. 1.

As illustrated in FIG. 1, the information processing unit 120 comprises a memory 121, an input/output control section 122, a display section 123, an external memory 124, an operational input section 125, and a processor 126.

The memory 121 includes a ROM (Read Only Memory), RAM (Random Access Memory), etc., and stores program data or any other various data. the input-output control section 122 includes a DMA (Direct Memory Access) controller. The memory 121, input/output control section 122, and processor 126 are connected with each other through a bus, and can send and receive data to and from one another. The input/output control section 122 controls the display section 123, the external memory 124, and the operational input section 125, so as to input and output various information.

The display section 123 has an LCD (Liquid Crystal Display) plate and a driving circuit, etc., for example, and display various data. The external memory 124 includes an HDD (Hard Disk Drive), a CD-ROM read circuit, or the like, and stores program data and any other various data. The operational input section 125 has a keyboard, etc., and sends various instructions to the processor 126.

The processor 126 has a CPU (Central Processing Unit), and controls each section included in the information processing unit 120, as will specifically described below.

The processor 126 supervises the state of the operational input section 125 through the input/output control section 122. The processor 126 reads out program data and various data from the memory 121 or external memory 124, in accordance with the operational state of the input/output control section 122. The processor 126 executes various information processing, based on the read data from the memory 121 or external memory 124, and controls the display section 123 to display information corresponding to the executed information processing.

Figure 2:
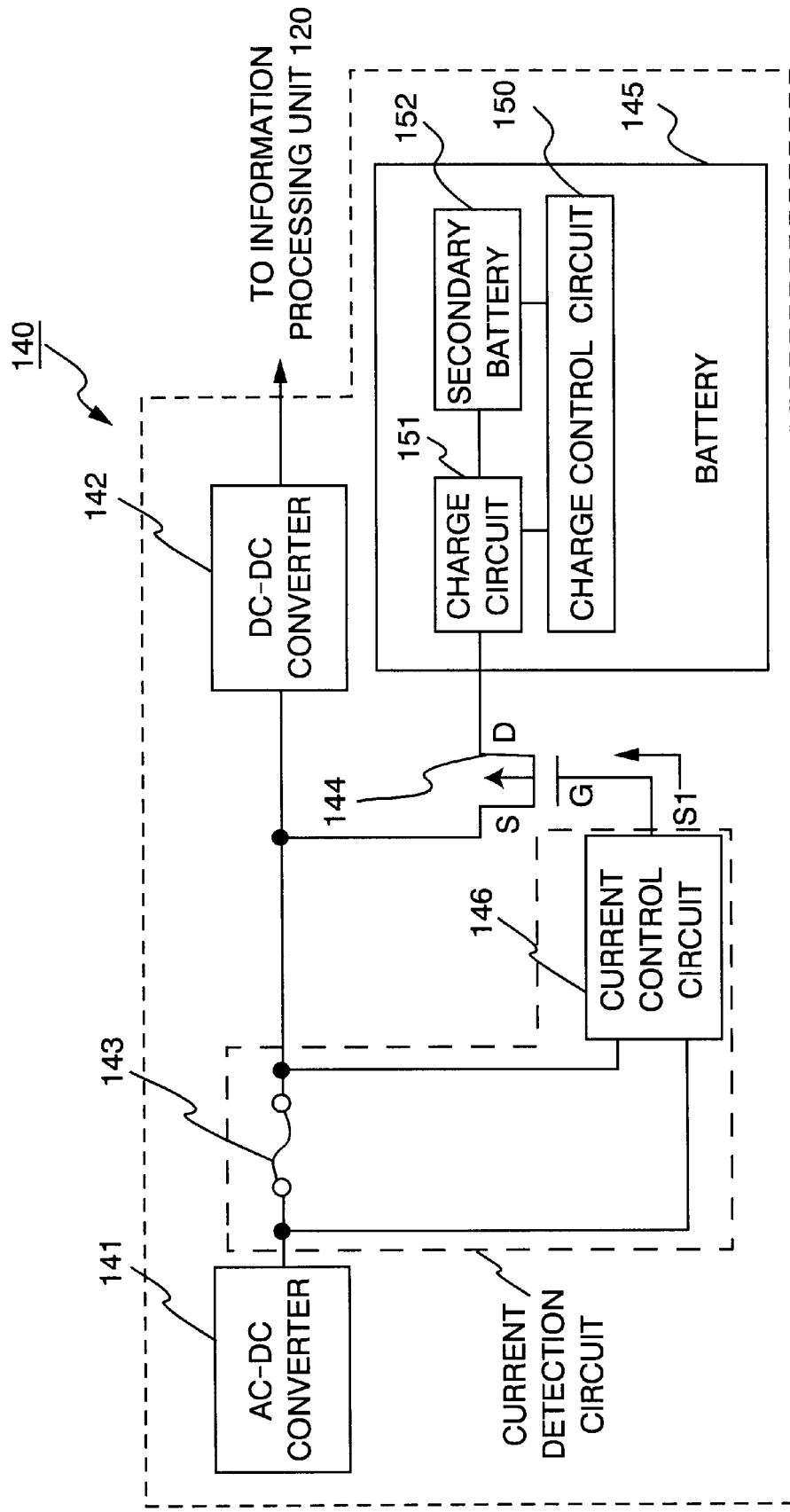
FIG. 2 is a block diagram showing the structure of an electric power supplier according to the first embodiment of the present invention.

As shown in FIG. 2, the electric power supplier 140 includes an AC-DC converter 141, a DC-DC converter 142, a fuse 143, a switching device 144, a battery 145, and a current control circuit 146.

The AC-DC converter 141 converts, for example, a commercial source voltage to a direct-current voltage of 19V (volts), and outputs the converted direct-current voltage.

The DC-DC converter 142 is connected to the AC-DC converter 141, and is a load which absorbs power from the AC-DC converter 141. The DC-DC converter 142 converts an output voltage value of the AC-DC converter 141 to a plurality of direct-current voltage values. To be more specific, connected to the DC-DC converter 142 is the information processing unit 120. The DC-DC converter 142 converts an output voltage of the AC-DC converter 141 to three direct-current voltages of, for example, 5.0V, 3.3V, 1.5V, and supplies the sections inside the information processing unit 120 with their corresponding one of the converted direct-current voltages.

The fuse 143 is, for example, of a current-fusing type. One end of the fuse 143 is connected to an output end of the AC-DC converter 141, and the other end thereof is connected to an input end of the DC-DC converter 142.

The switching device 144 includes a P-channel type MOSFET (Metal Oxide Semiconductor Field Effect Transistor). In this specification, the switching device 144 is hereinafter referred to as an FET 144. The source (S) of the FET 144 is connected to the other end of the fuse 143. A control voltage is sent from an output end of the current control circuit 146 to the gate (G) of the FET 144. The drain (D) of the FET 144 is connected to the battery 145, as will more specifically be described later. In the case where the FET 144 is in an on state, a current flows between the source and drain of the FET 144, and a current flows from the AC-DC converter 144 to the battery 145. In the state where the FET 144 is in an off state, no current flow between the source and drain of the FET 144, the battery 145 is electrically disconnected from the AC-DC converter 141.

The battery 145 is a load which absorbs power from the AC-DC converter 141. In the case where commercial electric power is suspended to be sent to the AC-DC converter 141, the battery 145 functions as a back-up power source for supplying electric power to the information processing unit 120. The battery 145 includes a charge control circuit 150, a charge circuit 151, and a secondary battery 152. In the case where the charge control circuit 150 is in the ON, the charge control circuit 150 controls the charge circuit 151 to charge the secondary battery 152 with electricity. As the secondary battery 152, any one of, for example, a lithium ion battery, a Nickel-cadmium battery, a Nickel-hydrogen battery, etc. can be employed. When the battery 145 functions as a back-up battery, it supplies each section inside the information processing unit 120 with electricity charged in the secondary battery 152 through the DC-DC converter 142.

The current control circuit 146 discriminates whether the current flowing through the fuse 143 is an overcurrent. In the case where it discriminated that the current is an overcurrent, the current control circuit 146 controls the FET 144 to reduce the amount of current flowing through the fuse 143. In particular, the current control circuit 146 detects a voltage across the fuse 143, and amplifies the detected voltage. The current control circuit 146 compares the value of the amplified voltage with a predetermined threshold value, and generates a control signal S1 corresponding to a result of the comparison. In this case, the threshold value is set to a value larger than the value of the amplified voltage across the fuse 143 in the case where a rated current of the AC-DC converter 141 flows through the fuse 143. The current control circuit 146 generates a control signal S1 at a low level, in the case where the value of the amplified voltage is lower than a threshold value, and generates a control signal S1 at a high level, in the case where the value of the amplified voltage is higher than a threshold value. Then, the current control circuit 146 supplies the gate of the FET 144 with the generated control signal S1.

If the electric power supplier 140 supplies the information processing unit 120 with driving electricity, and if the information processing unit 120 executes various processing operations, the personal computer 100 executes fundamental information processing, likewise any other general-purpose computers.

Generally, the electric power supplier 140 operates in the manner described below.

The AC-DC converter 141 converts a commercial source voltage of AC100V to a direct-current voltage of DC19V, for example. After this, the AC-DC converter 141 provides the direct-current voltage to the DC-DC converter 142 and battery 145. The DC-DC converter 142 converts an output voltage (19V) of the AC-DC converter 141 into three direct-current voltages of 5.0V, 3.3V, 1.5V, and supplies each section inside the information processing unit 120 with their corresponding one of the three direct-current voltages. The AC-DC converter 141 converts a commercial source voltage into a direct-current voltage, and outputs the converted direct-current voltage. Upon this, a current flows through the fuse 143, and a voltage drop is generated between both ends of the fuse 143. The current control circuit 146 detects the voltage across the fuse 143, amplifies the detected voltage, and compares the value of the amplified voltage with a threshold value. The current control circuit 146 generates a control signal S1 in accordance with a result of the comparison, and supplies the gate of the FET 144 with the generated control signal S1. The FET 144 will be in an ON or OFF state, in accordance with the supplied control signal S1.

In the case where, for example, the processor 126 or external memory 124 inside the information processing unit 120 is to consume relatively a large amount of electric power, a current having a value higher than a rated current value of the AC-DC converter 141 flows through the fuse 143. In such a case, the electric power supplier 140 operates as described below.

The current control circuit 146 discriminates that the value of the amplified voltage is higher than a threshold value, generates a control signal S1 at a high level, and supplies the gate of the FET 144 with the generated control signal S1. Because the FET 144 will be in an OFF state in response to the supplied control signal S1, no current flows between the source and drain of the FET 144. In addition, the battery 145 is electrically disconnected from the AC-DC converter 141. Hence, the AC-DC converter 141 supplies only the DC-DC converter 142 with a direct-current voltage. This prevents a state wherein the AC-DC converter 141 is over loaded.

While this state continues for a predetermined period of time, the amount of electric power consumed by the processor 126 or external memory 124 is reduced. Along with the reduction in the amount of consumed electric power, the current flowing through the fuse 143 is reduced, and the value thereof is returned to a value which is equal to or lower than the rated current value of the AC-DC converter 141 afterwards.

In the case where the current, whose value is equal to or lower than the rated current value of the AC-DC converter 141, flows through the fuse 143, the electricity power supplier 140 operates in the manner described below.

The current control circuit 146 discriminates that the value of the amplified voltage is lower than a threshold value, generates a control signal S1 at a low level, and supplies the gate of the FET 144 with the generated control signal S1. Because the FET 144 will be in an ON state in response to the supplied control signal S1, a current flows between the source and drain of the FET 144. The AC-DC converter 141 supplies the DC-DC converter 142 and battery 145 with a direct-current voltage.

In the battery 145, the charge control circuit 150 controls the charge circuit 151 to charge the secondary battery 152 with electricity. Even if the battery 145 is electrically disconnected from the AC-DC converter 141, while the secondary battery 152 of the battery 145 is charged with electricity, as long as the disconnection period is only a short period of time, the secondary battery 152 will not badly be effected.

Second Embodiment

In the above-described embodiment, the current control circuit 146 generates the control signal S1, based on the value of the both-end voltage of the fuse 143. However, the current control circuit 146 may generate the control signal S1, based on both of the value of the both-end voltage of the fuse 143 and the charge state of the secondary battery 152. Explanations will now be made to thus structured electric power supplier according to the second embodiment.

Figure 3:
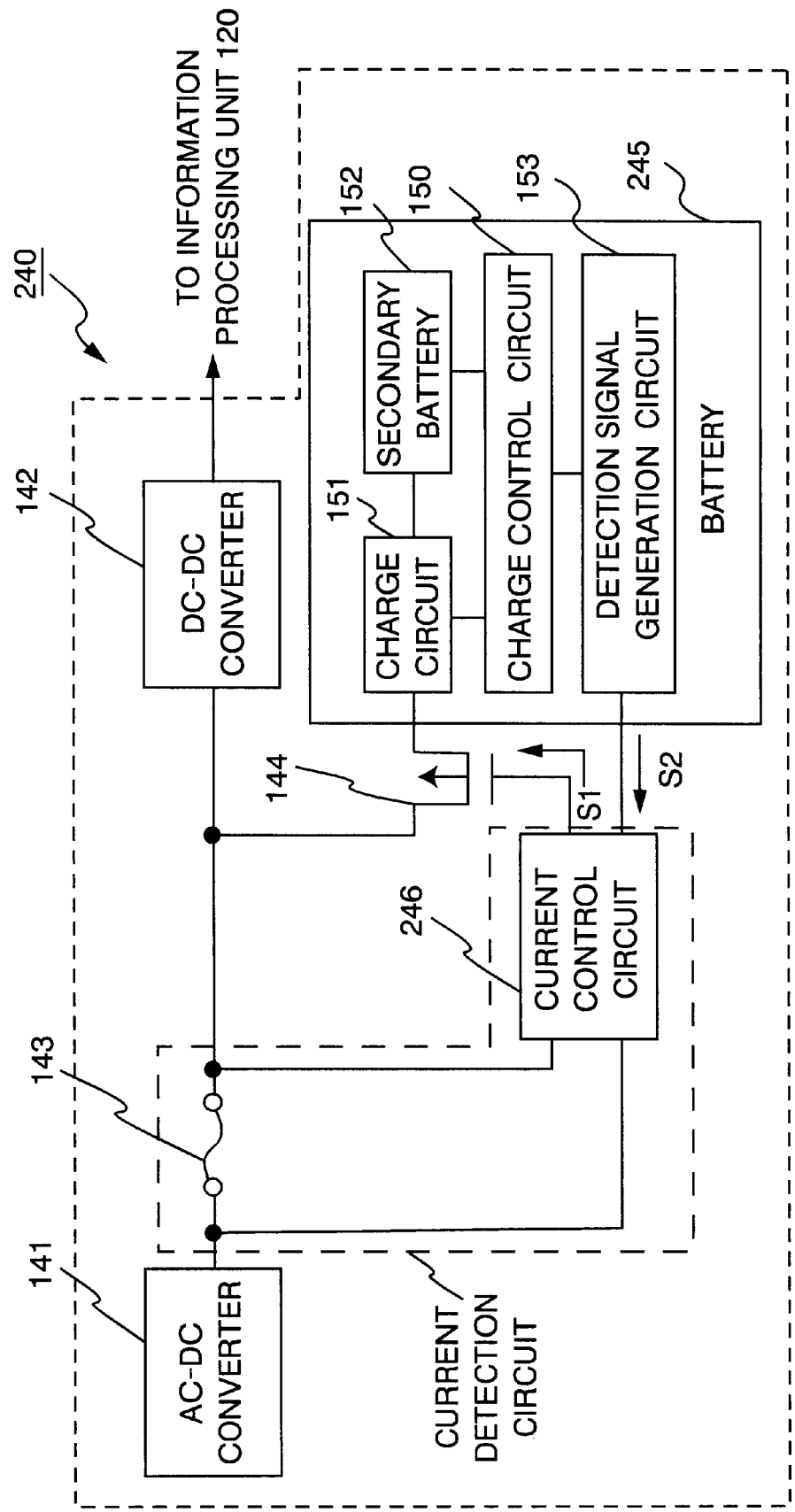
FIG. 3 is a block diagram showing the structure of an electric power supplier according to the second embodiment of the present invention.

FIG. 3 is a block diagram showing the structure of an electric power supplier 240 according to the second embodiment.

The electric power supplier 240 according to the second embodiment is installed in a personal computer, and has substantially the same structure as that of the electric power supplier of the first embodiment, so the same reference numerals as affixed to the same component elements.

A battery 245 has a detection signal generation circuit 153, in addition to the structure of the battery 145 described in the first embodiment. The detection signal generation circuit 153 detects whether the secondary battery 152 is fully charged with electricity, generates a detection signal S2, and sends the generated signal to the current control circuit 146.

The detection signal generation circuit 153 usually generates a detection signal S2 at a low level, and generates a detection signal S2 at a high level when the secondary battery 152 is fully charged with electricity.

When the value of the amplified both-end voltage is lager than a predetermined value, and when the detection signal S2 at a high level is supplied, the current control circuit 246 generated a control signal S1 for controlling the FET 144. In the case where the detection signal generation circuit 153 generates a detection signal S2 at a high level, the battery 245 can electrically be disconnected from the AC-DC converter 141. Hence, in the case where the detection signal S2 is at a high level, it is meant that the AC-DC converter 141 is electrically disconnected from the battery 245.

According to this embodiment, a direct-current voltage is stably supplied to the information processing unit 120. At the same time, while the secondary battery 152 is charged with electricity, the battery 245 is electrically disconnected from the AC-DC converter 141.

Third Embodiment

In the above-described embodiments, the electric power supplier detects whether the AC-DC converter 141 is over loaded, based on the current flowing through the fuse, and the AC-DC converter 141 is electrically disconnected from the battery 145. However, the component element for detecting the state wherein the AC-DC converter 141 is over loaded is not limited to the fuse. Explanations will now be made to the third embodiment of the present invention, which has another component element for detecting the above state.

Figure 4:
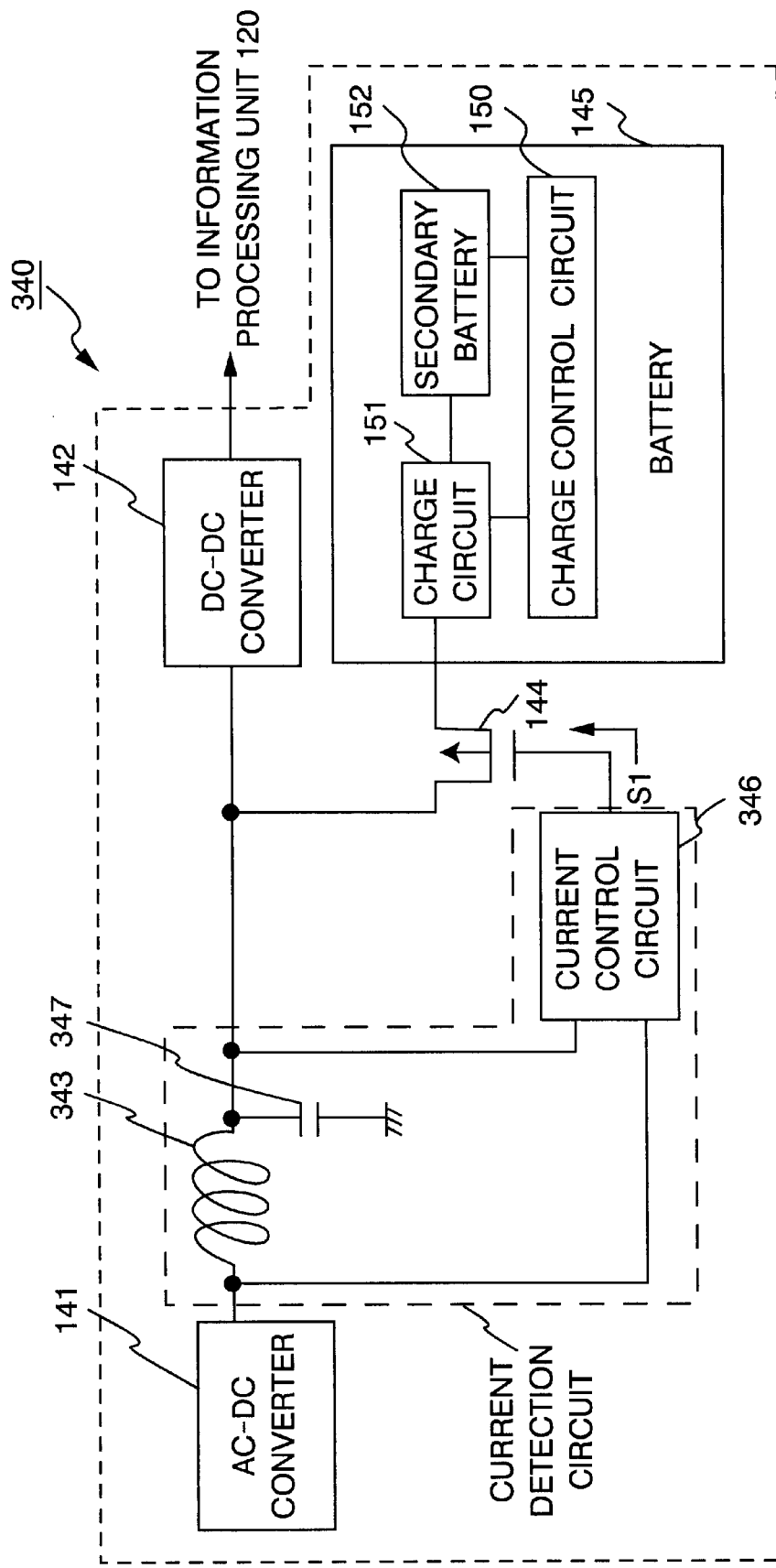
FIG. 4 is a block diagram showing the structure of an electric power supplier according to the third embodiment of the present invention.

FIG. 4 is a block diagram showing the structure of an electric power supplier 340 according to the third embodiment of the present invention.

The electric power supplier 340 is installed in a general-purpose personal computer. The direct-current voltage which is output from the AC-DC converter 141 includes frequency components which are caused by, for example, various noise, etc. In order to remove such noises, the electric power supplier 340 includes a noise filter. In place of the fuse, the electric power supplier 340 has substantially the same structure as that of the first embodiment, except that a coil included in the noise filter is used for detecting the state in which the AC-DC converter 141 is over loaded. Hence, the same reference numerals are affixed to the component elements.

A coil 343 forms a noise filter, together with a capacitor 347, and has a function as resistance for a current including the frequency components. One end of the coil 343 is connected to an input terminal of one end of the current control circuit 346. While the other end of the coil 343 is connected to an input terminal of the other end of the current control circuit 346 and to the source of the FET 144. The capacitor 347 is connected to the other end of the coil 343 and a ground line.

The current control circuit 346 detects and amplifies the voltage generated between both ends of the coil 343, and compares the amplified voltage value with a predetermined value. Under the same comparison condition performed in the first embodiment, the current control circuit 346 generates a control signal S1 at a high or low level.

According to the above structure, the electric power supplier 340 according to this embodiment, can be operated likewise the first embodiment. The electric power supplier 340 can attenuate noises to be transmitted to the information processing unit 120 connected to the electric power supplier 340, through the noise filter.

Fourth Embodiment

The structures of the electric power supplier and personal computer, in which the electric power supplier is installed, are not limited to those described in the above embodiments. A circuit which can electrically be disconnected from the AC-DC converter 141 may be prepared outside the electric power supplier. Explanations will now be made to an electric power supplier having such a structure, according to the fourth embodiment of the present invention.

Figure 5:
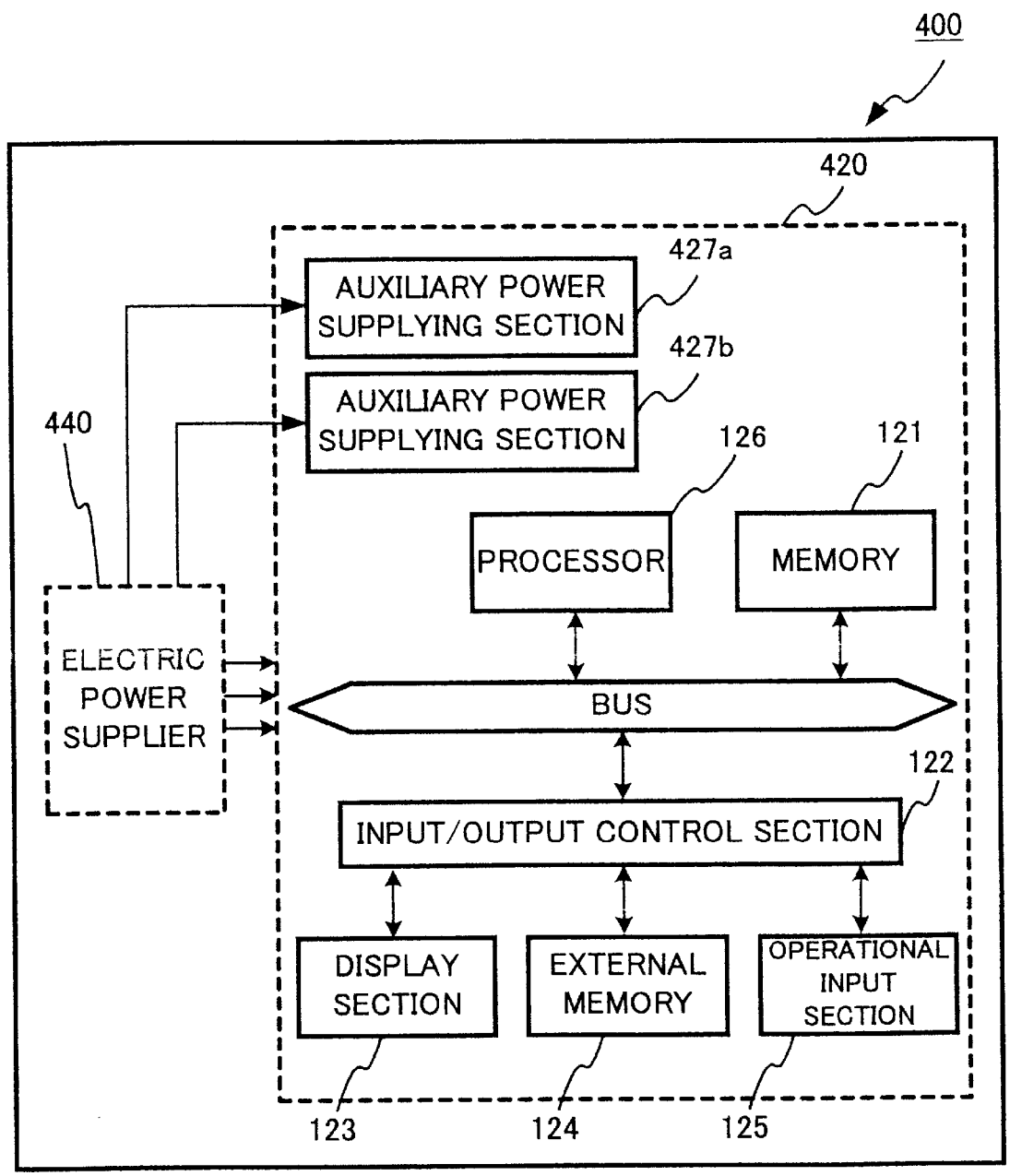
FIG. 5 is a block diagram showing the structure of a personal computer.

FIG. 5 is a block diagram showing the structure of a personal computer in which an electric power supplier 440 according to the fourth embodiment is installed.

This personal computer 400 briefly includes an information processing unit 420 and the electric power supplier 440.

The information processing unit 420 has substantially the same structure as that of the information processing unit 120 of the first embodiment, except that the information processing unit 420 includes two auxiliary power supplying sections 427a and 427b.

The electric power supplier 440 has substantially the same structure as that of the electric power supplier 140 of the second embodiment, except that the electric power supplier 440 individually supplies the auxiliary power supplying section 427a, 427b, and any other sections included in the personal computer 400 with electricity.

Each of the auxiliary power supplying sections 427a and 427b, which are shown in FIG. 5, has a secondary battery, and provides each section included in the information processing unit 120 with electricity, when electricity stops to be supplied from the electric power supplier 440.

Each of the auxiliary power supplying sections 427a and 427b detects the electricity charged-level of the secondary battery in its corresponding auxiliary power supplying section, generates binary-level detection signals S2a and S2b of high or low, and supplies the electric power supplier 440 with the generated signals.

When a current having a current value which is higher than the rated current value of the AC-DC converter 141 flows through the fuse 143, the electric power supplier 140 electrically disconnects at least one auxiliary power supplying section 427 from the AC-DC converter 141, thereby to stably supply any other sections included in the information processing unit 420 with electricity.

Figure 6:
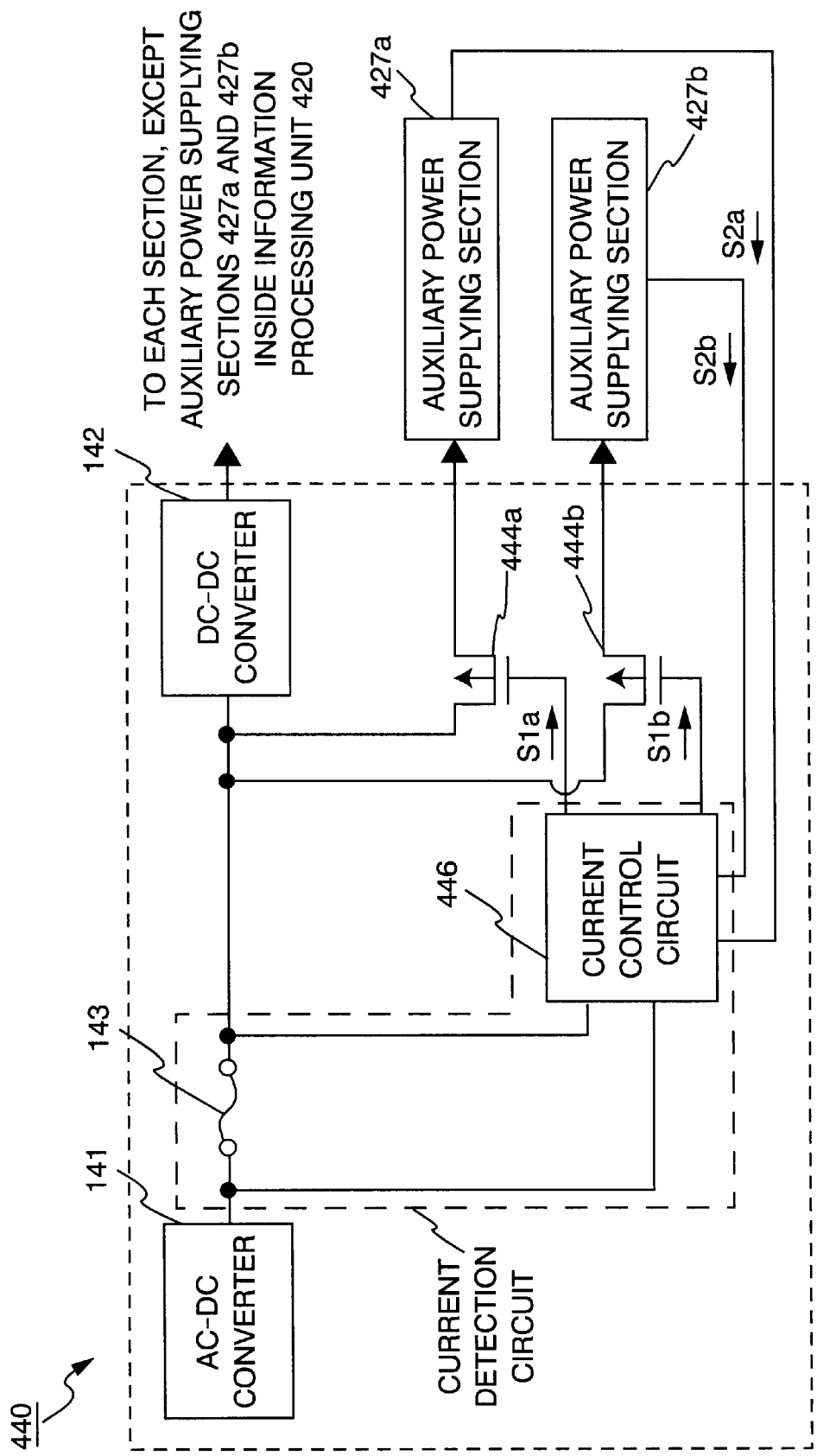
FIG. 6 is a block diagram showing the structure of an electric power supplier according to the fourth embodiment of the present invention.

The electric power supplier 440 has the structure shown in FIG. 6. The same reference numerals are affixed to the same component elements as those of the first embodiment.

As seen from FIG. 6, the DC-DC converter 142 is connected to any sections inside the information processing unit 420 other than the auxiliary power supplying sections 427a and 427b.

The AC-DC converter 141 is connected to each of the auxiliary power supplying sections 427a and 427b inside the information processing unit 420, through transmission paths of FETs 444a and 444b.

The current control circuit 446 has two detection-signal input terminals. Sent to the two detection-signal input terminals are detection signals S2a and S2b from the respective auxiliary power supplying sections 427a and 427b.

The current control circuit 446 has two control-signal output terminals, and sends control signals S1a and S1b to the gates of the FETs 444a and 444b corresponding to the auxiliary power supplying sections 427a and 427b, respectively.

According to the above-described structure, in the case where the detection signal S2a at a high level and the control signal S2b at a low level are sent respectively from the auxiliary power supplying sections 427a and 427b to the current control circuit 446, the electric power supplier 440 operates in the manner as will be described below.

The current control circuit 446 amplifies a voltage across the fuse 143, compares the amplified voltage with a threshold value. In the case where it is determined that the value of the amplified voltage generated between both ends of the fuse 143 is higher than the threshold value, the current control circuit 446 generates a control signal S1a at a high level and a control signal S1b at a low level. After this, the current control circuit 446 sends the control signal S1a at a high level to the gate of the FET 444a and a control signal S1b at a low level to the gate of the FET 444b. In response to the sent control signal S1, the FET 444a is OFF, and the AC-DC converter 141 does not send a direct-current voltage to the auxiliary power supplying section 427a. In response to the sent control signal S1, the FET 444b is ON, and the AC-DC converter 141 sends a direct-current voltage to the auxiliary power supplying section 427b. Hence, the voltage output from the AC-DC converter 141 is sent to the DC-DC converter 142 and auxiliary power supplying section 427b.

Similarly, in the case where detection signals S2a and S2b at a high level are sent from the auxiliary power supplying sections 427a and 427b to the current control circuit 446, the voltage output from the AC-DC converter 141 is sent only to the DC-DC converter 142.

According to this embodiment, the electric power supplier 440 can stably supply each fundamental section inside the information processing unit 420 with electricity, when the AC-DC converter 141 is over loaded. In addition, the electric power supplier 440 can continuously send electricity to any one of the auxiliary power supplying sections which is not fully charged with electricity.

Various embodiments and changes may be made thereonto without departing from the broad spirit and scope of the invention.

In the above explanations, the current control circuit 146 generates a control signal S1, in accordance with whether the value of the voltage across the fuse 143 is higher or lower than the threshold value. The present invention is not limited to this method. For example, the current control circuit 146 may generate the control signal S1, in accordance with the difference, between the detected voltage and the threshold value, and an integrated result of the difference, and a differentiated result of the difference, under the control of a PID (Proportional Integration and Differential) control program stored therein.

In the above-described embodiments, the explanations have been made to the battery circuit inside the electric power supplier or the auxiliary power supplying section inside the information processing unit, as one electrically disconnectable from the AC-DC converter 141. However, such a circuit which can be electrically disconnected from the AC-DC converter 141 is not limited to the above. Any circuit, other than the main circuit, such as the CPU or memory of the information processing device, etc., may electrically be disconnected from the AC-DC converter 141. For example, the personal computer may have the structure, wherein the backlight of the LCD (Liquid Crystal Display) is electrically disconnected from the AC-DC converter. In this case, at the time a current whose current value exceeds the rated current value of the AC-DC converter 141 flows through the fuse 143 inside the electric power supplier, the electricity is temporarily suspended to be sent thereto.

In the above-described embodiments, the current control circuit of the electric power supplier has determined whether the AC-DC converter is over loaded, based on the voltage across the fuse, or the coil forming the noise filter. However, the component element for detecting the current output from the AC-DC converter is not limited to the fuse or coil. For example, the element component for detecting the current output from the AC-DC converter may be a current transformer. In this case, the primary coil of the current transformer is formed in the voltage supply line for connecting the AC-DC converter and the DC-DC converter. The current control circuit is connected to the secondary coil of the current transformer, and detects whether the current flowing through the primary coil is an overcurrent.

In the above-described embodiments, the switching element 144 has been described as the P-channel type MOSFET. However, the switching element 144 may be a PNP-type bipolar transistor or any other device.

In the case where the value of the amplified voltage is higher than a predetermined value, the current control circuit 146 has been described as one generating a control signal S1 at a high level. However, when the value of the amplified voltage is higher than a predetermined value, the current control circuit 146 may generate a control signal S1 at a low level, and when the value of the amplified voltage is lower than the predetermined value, the current control circuit 146 may generate a control signal S1 at a low level. In this case, the switching device 144 is formed of an N-channel type MOSFET, for example.

The battery 145 has been explained as one usually generating a detection signal at a low level, and generating a detection signal at a high level when the secondary battery reaches a predetermined charged-electricity level. However, when the battery generates a detection signal at a high level and when the secondary battery reaches a predetermined charged-electricity level, the battery may generate a detection signal at a low level.

In the above-described embodiments, the electric power supplier has been explained as one installed in a personal computer. However, the electric power supplier may be installed in a portable information terminal, a information processing device, or the like. Further, the electric power supplier is not limited to one installed in the target electric device, and thus can externally be prepared on the electric device. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-141225 filed on May 15, 2000, and including specification, claims, drawings and summary. The disclosure of the above Japanese Patent Application is incorporated herein by reference in its entirety.

What is claimed is:

1. An electric power supplier comprising:
    an alternating/direct-current conversion circuit which converts an alternating voltage into a direct voltage, and outputs a converted voltage;
    a first path, one end of which is connected to said alternating/direct-current conversion circuit, and other end of which is connected to a first load, said first path supplying output voltage of said alternating/direct-current conversion circuit to said first load;
    a second path, one end of which is connected to said first path, and another end of which is connected to a second load, said second path comprising at least one battery circuit including a secondary battery, wherein said battery circuit detects whether the secondary battery is fully charged with electricity and sends a detection signal which represents detection results to a current control circuit, said current control circuit generates a control signal for electrically disconnecting a node from said second load, said second path supplying output voltage of said alternating/direct-current conversion circuit to said second load;
    a switch circuit which is formed in said second path; and
    a current detection circuit, including said current control circuit, which detects a value of a current flowing through a portion of said first path between said alternating/direct current conversion circuit and a node between said first path and said second path, and controls said switch circuit based on control signal generate by said current control circuit to electrically connect or disconnect the node to or from said second load, based on a detected current value.

2. The electric power supplier according to claim 1, wherein:
    said current detection circuit controls said switch circuit to electrically connect or disconnect the node to or from said second load, based on a difference between the detected current value and a predetermined current value, so that the detected current value becomes lower than the predetermined current value.

3. The electric power supplier according to claim 2, wherein:

said current detection circuit controls said switch circuit to electrically connect or disconnect the node to or from said second load, in accordance with at least one of the difference between the detected value and the predetermined current value, an integrated result of the difference, and a differentiated result of the difference.

4. The electric power supplier according to claim 1, wherein said current detection circuit controls said switch circuit to electrically disconnect the node from said second load, in a case where the detected value of the current is equal to or larger than a reference value which is an output current value of said alternating/direct-current conversion circuit being overloaded, and to electrically connect the node to said second load, in a case where the detected value of the current is lower than the reference value.

5. The electric power supplier according to claim 4, wherein said current detection circuit includes a passive element which is formed in a portion of said first path located between said alternating/direct-current conversion circuit and the node, and detects a value of a current flowing through said passive element, and compares a detected value of the current with the reference value.

6. The electric power supplier according to claim 5, wherein said current control circuit:
generates said control signal for controlling an operation of said switch circuit based on a voltage generated across the passive element; and
supplies said switch circuit with said control signal,
wherein said switch circuit electrically connects or disconnects the node to or from said second load, in accordance with the control signal.

7. The electric power supplier according to claim 6, wherein:
said control signal represents whether said second load is possible to electrically be disconnected from the node between said first path and said second path such that said second load is disconnected from said alternating/direct-current conversion circuit; and
said current control circuit generates the control signal for controlling an operation of said switch circuit, in a case where a current flowing through said passive element is equal to or larger than the reference value and the signal sent from said second load represents that said second load is possible to electrically be disconnected from the node between said first path and said second path such that said second load is disconnected from said an alternating/direct-current conversion circuit.

8. The electric power supplier according to claim 6, wherein said first load comprises a voltage-value conversion circuit which converts a voltage having a value of said alternating/direct-current conversion circuit into voltages having a plurality of values, and outputs the plurality of voltage.

9. The electric power supplier according to claim 8, wherein said voltage-value conversion circuit is connected to an information processing unit including a microprocessor and a memory.

10. The electric power supplier according to claim 8, wherein said second load comprises a battery circuit including a secondary battery; and
said battery circuit detects whether the secondary battery is fully charged with electricity, and sends a detection signal which represents detection results to said current control circuit; and
said current control circuit generates the control signal for electrically disconnecting the node from said second load, in a case where the current flowing through said passive element is equal to or larger than the reference value and the detection signal represents that the secondary battery is fully charged.

11. The electric power supplier according to claim 5, wherein said passive element comprises a fuse.

12. The electric power supplier according to claim 5, wherein said passive element comprises a coil included in a noise filter.

13. A method for controlling supplying of electric power, comprising
sending electric power to a first load from a power circuit via a first path;
sending electric power to a second load, comprising a secondary battery, from said power circuit via a second path connected to the first path;
detecting a signal from a second load which indicates that the battery is fully charged;
disconnecting said second load according said signal;
detecting a value of the electric power sent from said power circuit to the first and second loads; and
electrically connecting and disconnecting a node between the first and second paths to or from the second load, based on a detected value of the electric power.

14. The method according to claim 13, wherein said electrically connecting and disconnecting includes:
electrically connecting and disconnecting the node to or from the second load, so that the detected value of the power becomes equal to or lower than the predetermined value, based on a difference between the detected value and a predetermined value of the power.

15. The method according to claim 13, wherein said electrically connecting and disconnecting includes:
electrically connecting or disconnecting the node to or from the second load, in accordance with at least one of the difference between the detected value of the power and the predetermined value of the power, an integrated result of the difference, and a differentiated result of the difference.

16. The method according to claim 13, wherein said electrically connecting and disconnecting includes:
electrically disconnecting the node from the second load, in a case where the detected value of the electric power is equal to or higher than a reference value which is output power of said power circuit being overloaded; and
electrically connecting the node to the second load, in a case where the detected value of the electric power is lower than the reference value.

17. The method according to claim 16, wherein said detecting includes:
detecting a value of output power of said power circuit, based on a value of a current flowing through a passive element which is formed in a portion of the first path between said power circuit and the node; and
comparing a detected value with the reference value.

18. The method according to claim 17, wherein said detecting includes:
generating a control signal for controlling an operation of a switch circuit which is formed in the second path;
sending the control signal to the switch circuit; and wherein
said electrically connecting and disconnecting includes connecting and disconnecting the node to or from the second load by controlling the switch circuit, in accordance with the control signal.

19. The method according to claim 17, wherein said passive element comprises a fuse, or a coil included in a noise filter.

20. The method according to claim 18, wherein said sending the control signal includes:
   accepting a permitting signal, for permitting the second load to electrically be disconnected from the node between said first path and said second path; and
   generating the control signal for controlling an operation of said switching circuit, in a case where the detected value of the power is equal to or higher than the reference value and the permitting signal sent from the second load represents that the second load is possible to electrically be disconnected form the node between said first path and said second path.

21. An information processing device comprising:
   electric power supplier having an alternating/direct-current conversion circuit which converts an alternating voltage into a direct voltage, and outputs a converted voltage;
   a first path, one end of which is connected to said alternating/direct-current conversion circuit, and other end of which is connected to a first load, said first path supplying output voltage of said alternating/direct-current conversion circuit to said first load;
   a second path, one end of which is connected to said first path, and another end of which is connected to a second load, comprising a battery circuit including a secondary battery, wherein said battery circuit detects whether the secondary battery is fully charged with electricity, and sends a detection signal which represents detection results to a current control circuit and said current control circuit generates a control signal for electrically disconnecting the node from said second load,
   a switch circuit which is formed in said second path; and
   a current detection circuit which detects a value of a current flowing through a portion of said first path between said alternating/direct current conversion circuit and a node between said first path and said second path, and controls said switch circuit to electrically connect or disconnect the node to or from said second load, based on a detected current value; and
   an information processing unit which is connected to said electric power supplier and driven by a voltage, applied thereto and sent from said electric power supplier; and
   wherein said information processing unit includes
      a memory which stores information,
      an operational input section which inputs an instruction,
      an input/output control section which performs inputting and outputting processing,
      a display section which displays information, and
      a processor which supervises a state of said operational input section through said input/output control section, reads out information from said memory and/or an external memory, executes processing based on read information, and controls said display section to display information corresponding to executed processing.

* * * * *